US012159578B2

(12) United States Patent
Uchida

(10) Patent No.: US 12,159,578 B2
(45) Date of Patent: Dec. 3, 2024

(54) DISPLAY DEVICE AND METHOD FOR DRIVING SAME

(71) Applicant: Sharp Kabushiki Kaisha, Sakai (JP)

(72) Inventor: Seiichi Uchida, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 376 days.

(21) Appl. No.: 17/767,472

(22) PCT Filed: Oct. 23, 2019

(86) PCT No.: PCT/JP2019/041456
§ 371 (c)(1),
(2) Date: Apr. 8, 2022

(87) PCT Pub. No.: WO2021/079423
PCT Pub. Date: Apr. 29, 2021

(65) Prior Publication Data
US 2023/0186847 A1 Jun. 15, 2023

(51) Int. Cl.
*G09G 3/3233* (2016.01)
*G09G 3/00* (2006.01)

(52) U.S. Cl.
CPC ........... *G09G 3/3233* (2013.01); *G09G 3/006* (2013.01); *G09G 2300/0842* (2013.01);
(Continued)

(58) Field of Classification Search
None
See application file for complete search history.

(56) References Cited

U.S. PATENT DOCUMENTS

2006/0221015 A1* 10/2006 Shirasaki ............... G09G 3/325 345/77
2008/0252568 A1* 10/2008 Kwon .................. G09G 3/3233 345/76

(Continued)

FOREIGN PATENT DOCUMENTS

KR 10-2019-0009214 A 1/2019
WO 2014/141958 A1 9/2014
WO 2015/012216 A1 1/2015

OTHER PUBLICATIONS

Official Communication issued in International Patent Application No. PCT/JP2019/041456, mailed on Dec. 10, 2019.

*Primary Examiner* — Benjamin X Casarez
(74) *Attorney, Agent, or Firm* — Keating & Bennett, LLP

(57) ABSTRACT

In a display device including scanning lines, light emission control lines, data lines, pixel circuits, and a drive circuit that drives the scanning lines, the light emission control lines, and the data lines, the pixel circuit includes a light-emitting element and a drive transistor that controls the amount of current flowing through the light-emitting element. The drive circuit has a monitoring mode, and during a frame period in the monitoring mode, the drive circuit sets non-light-emission periods, which are sequentially delayed and have the same length, for rows of the pixel circuits, selects a row to be measured from among the rows of the pixel circuits as a monitoring row, sets a monitoring period that partially overlaps a non-light-emission period of the monitoring row, and measures characteristics of light-emitting elements or drive transistors in pixel circuits in the monitoring row during the monitoring period.

20 Claims, 15 Drawing Sheets

(52) U.S. Cl.
CPC ............... *G09G 2300/0861* (2013.01); *G09G 2310/0202* (2013.01); *G09G 2310/0264* (2013.01); *G09G 2310/08* (2013.01); *G09G 2320/029* (2013.01); *G09G 2330/12* (2013.01)

(56) References Cited

U.S. PATENT DOCUMENTS

| | | | | |
|---|---|---|---|---|
| 2011/0227906 | A1* | 9/2011 | Shirasaki ............. | G09G 3/3233<br>345/212 |
| 2014/0292624 | A1* | 10/2014 | Choi .................... | G09G 3/3233<br>345/82 |
| 2015/0379940 | A1 | 12/2015 | Kishi | |
| 2016/0300534 | A1* | 10/2016 | Kishi ................... | G09G 3/3283 |
| 2019/0012948 | A1* | 1/2019 | Ohara .................. | G09G 3/3258 |

* cited by examiner

DISPLAY DEVICE AND METHOD FOR DRIVING SAME

TECHNICAL FIELD

The present disclosure relates to a display device, and particularly to a display device including pixel circuits each including a current-driven-type light-emitting element.

BACKGROUND ART

In recent years, an organic EL display device including pixel circuits each including an organic electroluminescence (hereinafter, referred to as EL) element has been put to practical use. The pixel circuit of the organic EL display device includes a drive transistor, a write control transistor, etc., in addition to the organic EL element. For those transistors, thin-film transistors (hereinafter, referred to as TFTs) are used. The organic EL element is a current-driven-type light-emitting element that emits light at luminance determined based on the amount of current flowing therethrough. The drive transistor is provided in series with the organic EL element and controls the amount of current flowing through the organic EL element.

Variations or fluctuations occur in characteristics of the organic EL element and the drive transistor. Hence, in order for the organic EL display device to perform high quality display, there is a need to compensate for variations or fluctuations in characteristics of those elements. For the organic EL display device, there are known a method in which the characteristics of elements are compensated for inside the pixel circuit (internal compensation) and a method in which the characteristics of elements are compensated for outside the pixel circuit (external compensation). An organic EL display device that performs external compensation measures a current flowing inside a pixel circuit (specifically, a current flowing through an organic EL element or a drive transistor) outside the pixel circuit, and corrects a video signal outside the pixel circuit, based on a result of the measurement.

The pixel circuit of the organic EL display device may include a light emission control transistor that controls light emission of the organic EL element. Patent Document 1 describes an organic EL display device that includes pixel circuits each including a light emission control transistor, and performs external compensation.

PRIOR ART DOCUMENT

Patent Document

[Patent Document 1] WO 2014/141958 A

SUMMARY

Problems to be Solved by the Invention

It is preferred that the organic EL display device that performs external compensation measure a current flowing inside a pixel circuit, while displaying a screen. However, to measure a current while displaying a screen, there is a need to drive scanning lines by a special method so as to select a pixel circuit to be measured. Hence, problems occur, e.g., the configuration or operation of a scanning line drive circuit becomes complex or a display screen is affected.

Therefore, it is a problem to provide a display device that can easily measure characteristics of elements in pixel circuits while displaying a screen.

Means for Solving the Problems

The above-described problem can be solved by, for example, a display device including a plurality of scanning lines; a plurality of light emission control lines; a plurality of data lines; a plurality of pixel circuits arranged in a row direction and a column direction; and a drive circuit configured to write data potentials into the plurality of pixel circuits by driving the plurality of scanning lines, the plurality of light emission control lines, and the plurality of data lines, and the pixel circuit includes a light-emitting element and a drive transistor configured to control an amount of current flowing through the light-emitting element, and the drive circuit has a monitoring mode, and during a frame period in the monitoring mode, the drive circuit sets non-light-emission periods for rows of the plurality of pixel circuits, selects a row to be measured from among the rows of the plurality of pixel circuits as a monitoring row, sets a monitoring period that partially overlaps a non-light-emission period of the monitoring row, and measures characteristics of light-emitting elements or drive transistors in pixel circuits in the monitoring row during the monitoring period, the non-light-emission periods being sequentially delayed and having a same length.

In addition, the above-described problem can also be solved by a method for driving a display device including a plurality of scanning lines; a plurality of light emission control lines; a plurality of data lines; and a plurality of pixel circuits arranged in a row direction and a column direction and each including a light-emitting element and a drive transistor configured to control an amount of current flowing through the light-emitting element, the method including the steps of: setting non-light-emission periods for rows of the plurality of pixel circuits, the non-light-emission periods being sequentially delayed and having a same length; selecting a row to be measured from among the rows of the plurality of pixel circuits as a monitoring row; setting a monitoring period that partially overlaps a non-light-emission period of the monitoring row; and measuring characteristics of light-emitting elements or drive transistors in pixel circuits in the monitoring row during the monitoring period.

Effects of the Invention

According to the above-described display device and method for driving the display device, by measuring characteristics of elements in the pixel circuits while controlling light-emitting elements included in pixel circuits in a predetermined range of rows including a monitoring row to a non-light-emission state, a display screen can be prevented from being affected. In addition, the above-described non-light-emission periods can be set for the rows of the pixel circuits, using a simple circuit. Thus, characteristics of elements in the pixel circuits can be easily measured while a screen is displayed.

MODES FOR CARRYING OUT THE INVENTION

First Embodiment

Figure 1:
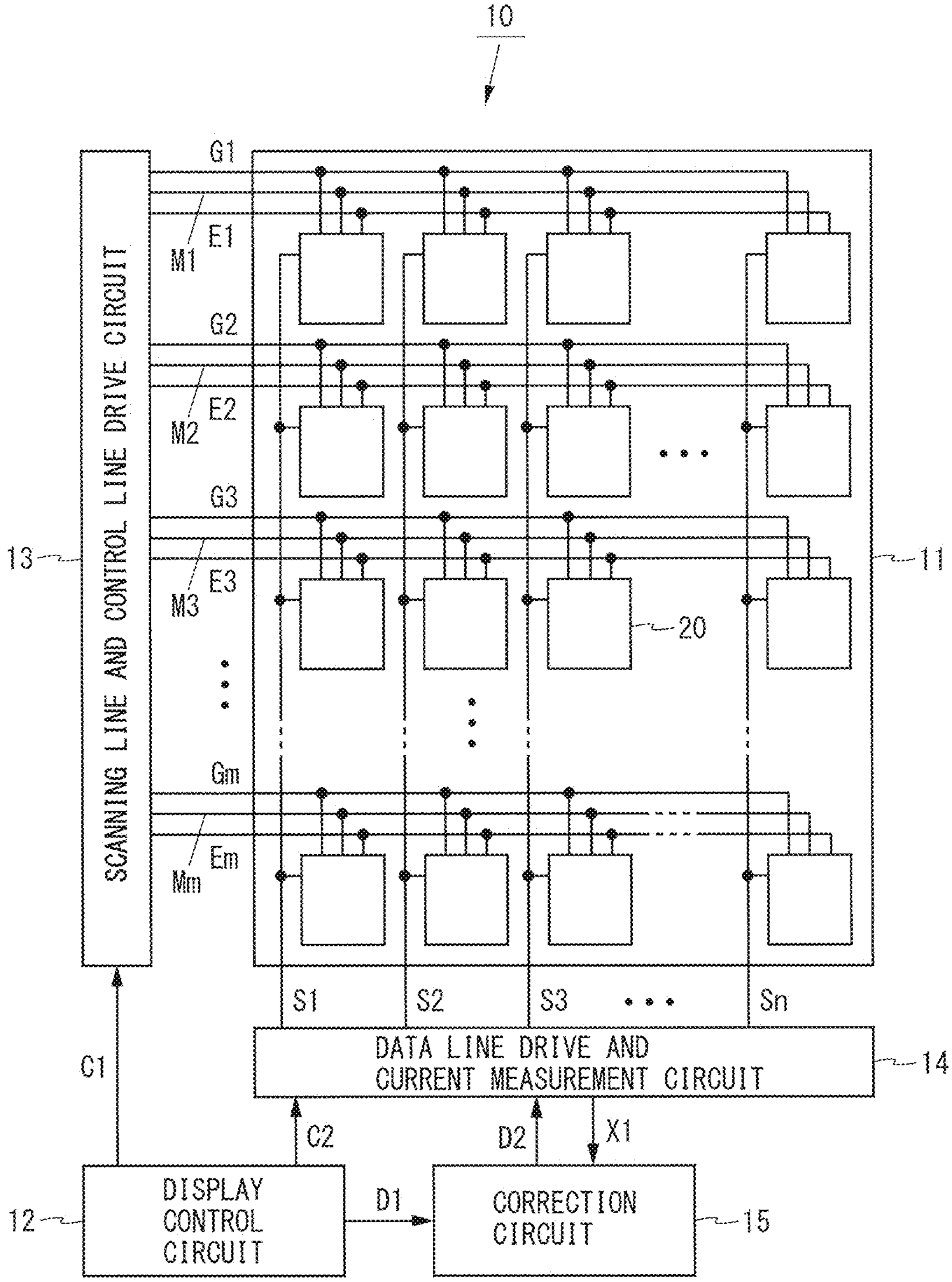
FIG. 1 is a block diagram showing a configuration of a display device according to a first embodiment.

FIG. 1 is a block diagram showing a configuration of a display device according to a first embodiment. A display device 10 shown in FIG. 1 is an organic EL display device including a display unit 11, a display control circuit 12, a scanning line and control line drive circuit 13, a data line drive and current measurement circuit 14, and a correction circuit 15. In the following description, m and n are integers greater than or equal to 2, i and k are integers between 1 and m, inclusive, and j is an integer between 1 and n, inclusive. A horizontal direction in FIG. 1 is referred to as "row direction" and a vertical direction in FIG. 1 is referred to as "column direction".

The display unit 11 includes m scanning lines G1 to Gm, m monitoring control lines M1 to Mm, m light emission control lines E1 to Em, n data lines S1 to Sn, and (m×n) pixel circuits 20. The scanning lines G1 to Gm, the monitoring control lines M1 to Mm, and the light emission control lines E1 to Em extend in the row direction and are arranged in parallel to each other. The data lines S1 to Sn extend in the column direction and are arranged in parallel to each other so as to be orthogonal to the scanning lines G1 to Gm. The scanning lines G1 to Gm and the data lines S1 to Sn intersect at (m×n) locations. The (m×n) pixel circuits 20 are arranged so as to correspond to points of intersection of the scanning lines G1 to Gm and the data lines S1 to Sn. A high-level power supply potential ELVDD and a low-level power supply potential ELVSS are supplied to the pixel circuits 20, using conductive members which are not shown.

The display control circuit 12 outputs a control signal C1 to the scanning line and control line drive circuit 13, outputs a control signal C2 to the data line drive and current measurement circuit 14, and outputs video signals D1 to the correction circuit 15. The scanning line and control line drive circuit 13 is a circuit into which a scanning line drive circuit and a control line drive circuit (neither of them is shown) are integrated. The scanning line and control line drive circuit 13 drives the scanning lines G1 to Gm, the monitoring control lines M1 to Mm, and the light emission control lines E1 to Em, based on the control signal C1.

The data line drive and current measurement circuit 14 is a circuit into which a data line drive circuit and a current measurement circuit (neither of them is shown) are integrated. The data line drive and current measurement circuit 14 drives the data lines S1 to Sn, based on the control signal C2 and corrected video signals D2 outputted from the correction circuit 15. In addition, the data line drive and current measurement circuit 14 measures currents flowing inside the pixel circuits 20 via the data lines S1 to Sn, based on the control signal C2 and outputs measurement results X1 to the correction circuit 15. The correction circuit 15 corrects the video signals D1 based on the measurement results X1, and outputs corrected video signals D2 to the data line drive and current measurement circuit 14.

The scanning line and control line drive circuit 13 and the data line drive and current measurement circuit 14 function as a drive circuit that writes data potentials into the pixel circuits 20 by driving the scanning lines G1 to Gm, the monitoring control lines M1 to Mm, the light emission control lines E1 to Em, and the data lines S1 to Sn. The drive circuit has a normal mode and a monitoring mode. In the normal mode, the drive circuit performs a display process that displays a screen based on video signals. In the monitoring mode, the drive circuit performs a monitoring process that measures currents flowing inside pixel circuits, outside the pixel circuits, in addition to the display process. The monitoring process is performed for pixel circuits of one row during one frame period. A row to be subjected to a monitoring process is referred to as "monitoring row", and a period during which the monitoring process is performed is referred to as "monitoring period".

Note that in FIG. 1, one scanning line and control line drive circuit 13 is provided along one side of the display unit 11 to drive the scanning lines G1 to Gm, etc., from the left end using the one scanning line and control line drive circuit 13. Instead, two scanning line and control line drive circuits 13 may be provided along respective two facing sides of the display unit 11 to drive the scanning lines G1 to Gm, etc., from both ends using the two scanning line and control line drive circuits 13.

Figure 2:
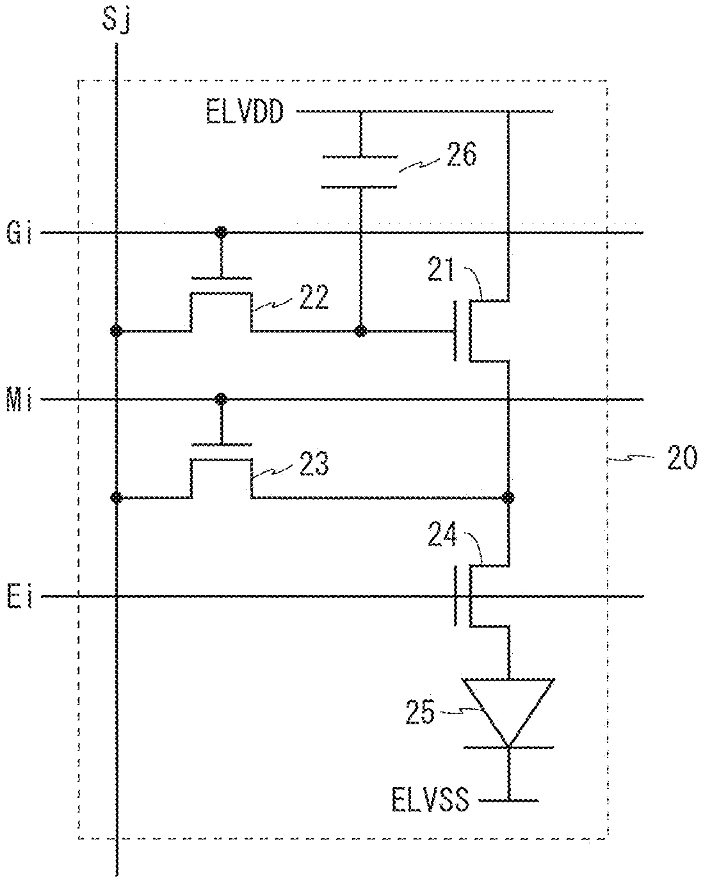
FIG. 2 is a circuit diagram of a pixel circuit of the display device shown in FIG. 1.

FIG. 2 is a circuit diagram of a pixel circuit 20. FIG. 2 describes a pixel circuit 20 in an ith row and a jth column. The pixel circuit 20 includes TFTs 21 to 24, an organic EL element 25, and a capacitor 26, and is connected to a scanning line Gi, a monitoring control line Mi, a light emission control line Ei, and a data line Sj. The TFTs 21 to 24 are N-channel-type transistors.

A high-level power supply potential ELVDD is applied to a drain terminal of the TFT 21. A source terminal of the TFT 21 is connected to a drain terminal of the TFT 24. A source terminal of the TFT 24 is connected to an anode terminal of the organic EL element 25. A low-level power supply potential ELVSS is applied to a cathode terminal of the organic EL element 25. One conductive terminal (a terminal on the left side in FIG. 2) of each of the TFTs 22 and 23 is connected to the data line Sj. The other conductive terminal of the TFT 22 is connected to a gate terminal of the TFT 21. The other conductive terminal of the TFT 23 is connected to the source terminal of the TFT 21 and the drain terminal of the TFT 24. Gate terminals of the TFTs 22, 23, and 24 are connected to the gate line Gi, the monitoring control line Mi, and the light emission control line Ei, respectively. The capacitor 26 is provided between a conductive member having the high-level power supply potential ELVDD and the gate terminal of the TFT 21.

The organic EL element 25 functions as a light-emitting element. The TFT 21 functions as a drive transistor that controls the amount of current flowing through the light-emitting element. The TFT 22 has a control terminal connected to the scanning line Gi and functions as a write control transistor that controls writing of a data potential. The TFT 23 functions as a monitoring control transistor having a control terminal connected to the monitoring control line Mi. The TFT 24 has a control terminal connected to the light emission control line Ei and functions as a light emission control transistor that controls light emission of the light-emitting element.

Figure 3:
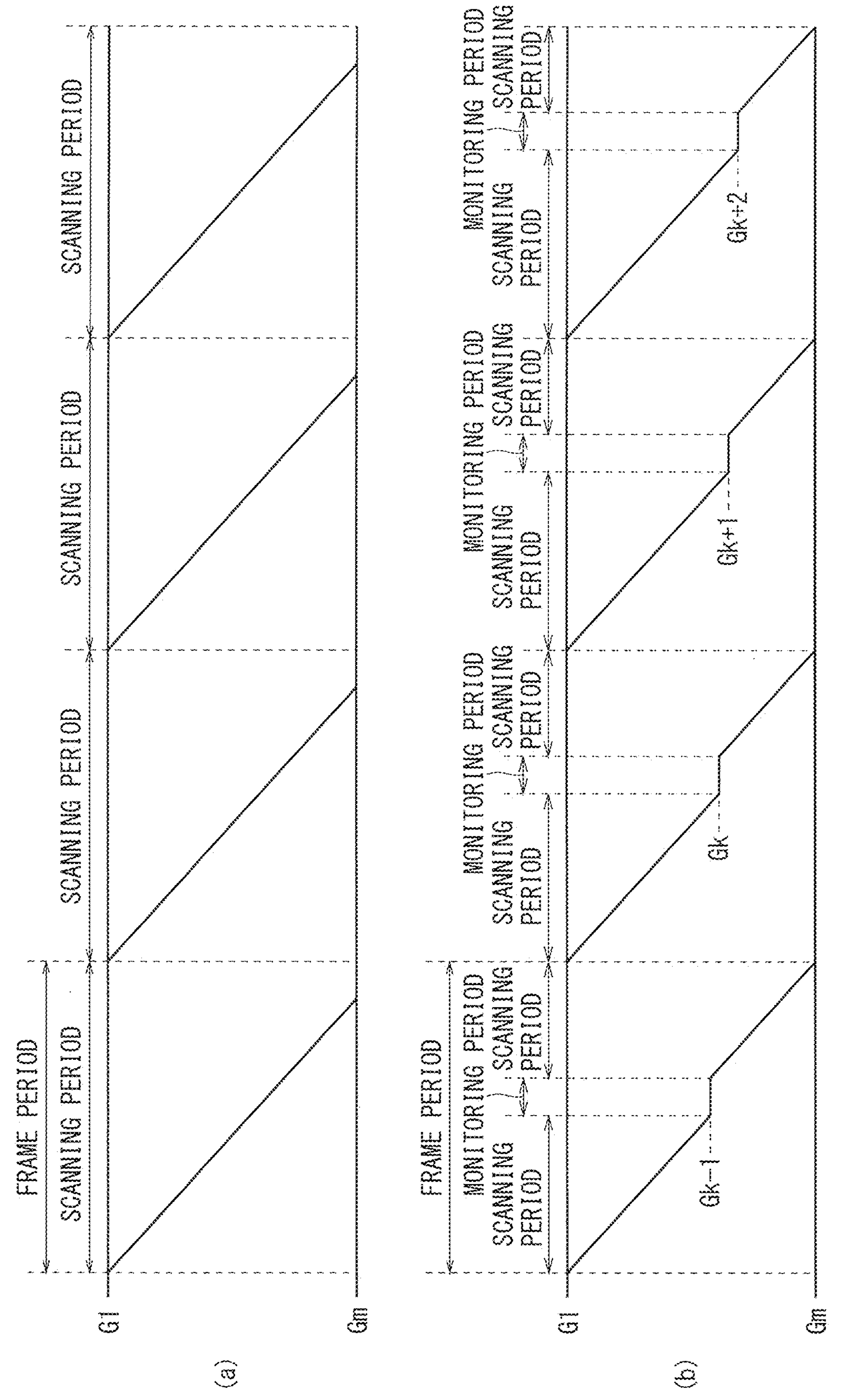
FIG. 3 is a diagram showing selection timing of scanning lines of the display device shown in FIG. 1.

FIG. 3 is a diagram showing selection timing of the scanning lines G1 to Gm. The selection timing of the scanning lines G1 to Gm differs between the normal mode and the monitoring mode. In the normal mode ((a) of FIG. 3), the entire frame period is a scanning period. The scanning lines G1 to Gm are selected in turn for one horizontal period during the scanning period.

In the monitoring mode ((b) of FIG. 3), one monitoring period is set in a frame period and other portions are scanning periods. For example, when a kth row is a monitoring row, a monitoring period is set after a selection period of a scanning line Gk−1. Scanning lines G1 to Gk−1 are selected in turn for one horizontal period during a scanning period earlier than the monitoring period. Scanning lines Gk to Gm are selected in turn for one horizontal period during a scanning period later than the monitoring period. In the next frame period, a (k+1)th row is selected as a monitoring row, and in a subsequent frame period, a (k+2)th row is selected as a monitoring row. A monitoring row is selected in turn from among the m rows of the pixel circuits 20.

Figure 4:
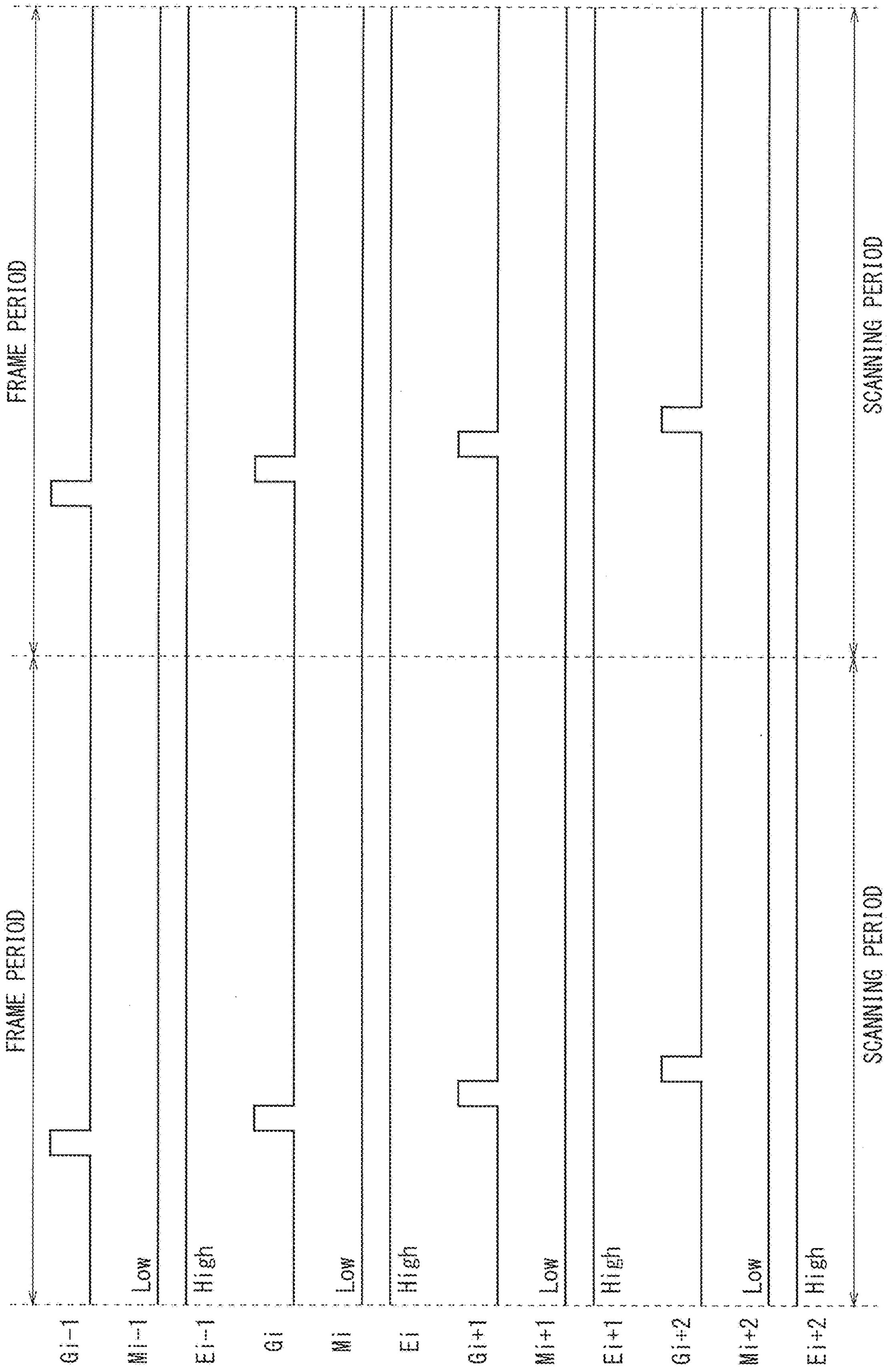
FIG. 4 is a timing chart for the display device shown in FIG. 1 in a normal mode.

FIG. 4 is a timing chart for the display device 10 in the normal mode. FIG. 4 describes changes in the potentials of signal lines during two frame periods. In the normal mode, a low-level potential is fixedly applied to the monitoring control lines M1 to Mm, and a high-level potential is fixedly applied to the light emission control lines E1 to Em. The high-level potential is an on potential that turns on the TFTs in the pixel circuits 20, and the low-level potential is an off potential that turns off the TFTs in the pixel circuits 20. In the normal mode, in all pixel circuits 20, the TFTs 23 are turned off and the TFTs 24 are turned on.

During an ith horizontal period, a high-level potential is applied to a scanning line Gi, and a low-level potential is applied to other scanning lines. Hence, TFTs 22 included in pixel circuits 20 in an ith row are turned on and the pixel circuits 20 in the ith row are collectively selected. To the data lines S1 to Sn are respectively applied n data potentials determined based on corrected video signals D2. Hence, in each of the pixel circuits 20 in the ith row, the gate potential of the TFT 21 is equal to a data potential applied to a corresponding data line, and such an amount of electric charge that is determined based on the data potential is accumulated in the capacitor 26. In this manner, the n data potentials applied to the data lines S1 to Sn are written into the respective pixel circuits 20 in the ith row.

During horizontal periods other than the ith horizontal period, a low-level potential is applied to the scanning line Gi. Hence, the TFTs 22 included in the pixel circuits 20 in the ith row are turned off. In each of the pixel circuits 20 in the ith row, after writing the data potential, a current that passes through the TFTs 21 and 24 and the organic EL element 25 flows from the conductive member having the high-level power supply potential ELVDD to a conductive member having the low-level power supply potential ELVSS. The amount of the current changes depending on the data potential. Thus, the organic EL element 25 emits light at luminance determined based on the data potential.

Figure 5:
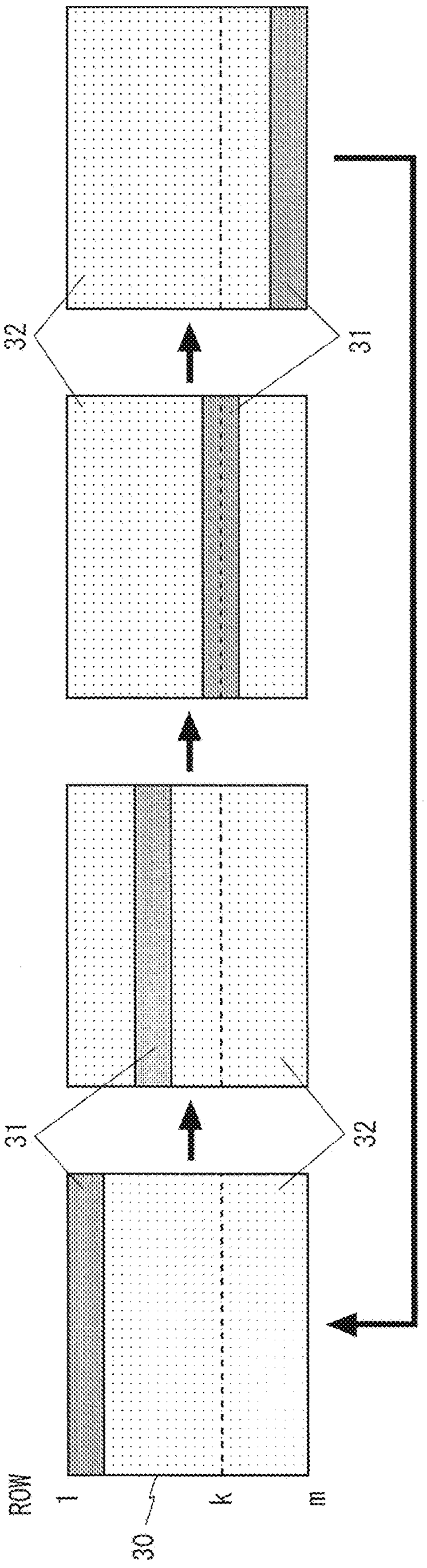
FIG. 5 is a diagram showing a non-light-emitting portion of a display screen of the display device shown in FIG. 1 in a monitoring mode.

FIG. 5 is a diagram showing a non-light-emitting portion of a display screen of the display device 10 in the monitoring mode. As shown in FIG. 5, in the monitoring mode, a strip-shaped non-light-emitting portion 31 is set on a display screen 30, and other portions serve as light-emitting portions 32. The scanning line and control line drive circuit 13 controls organic EL elements 25 included in pixel circuits 20 in light-emitting portions 32 to a light emission state and controls organic EL elements 25 included in pixel circuits 20 in a non-light-emitting portion 31 to a non-light-emission state, by driving the light emission control lines E1 to Em.

Around the beginning of a frame period, the non-light-emitting portion 31 is present at the uppermost location on the display screen 30. The non-light-emitting portion 31 moves from top to bottom on the display screen during the frame period, and around the end of the frame period, the non-light-emitting portion 31 is present at the lowermost location on the display screen 30. The most part of a monitoring process is performed while a monitoring row is included in the non-light-emitting portion 31. For example, when a kth row is a monitoring row, the most part of a monitoring process is performed while pixel circuits 20 in the kth row are included in the non-light-emitting portion 31.

Figure 6:
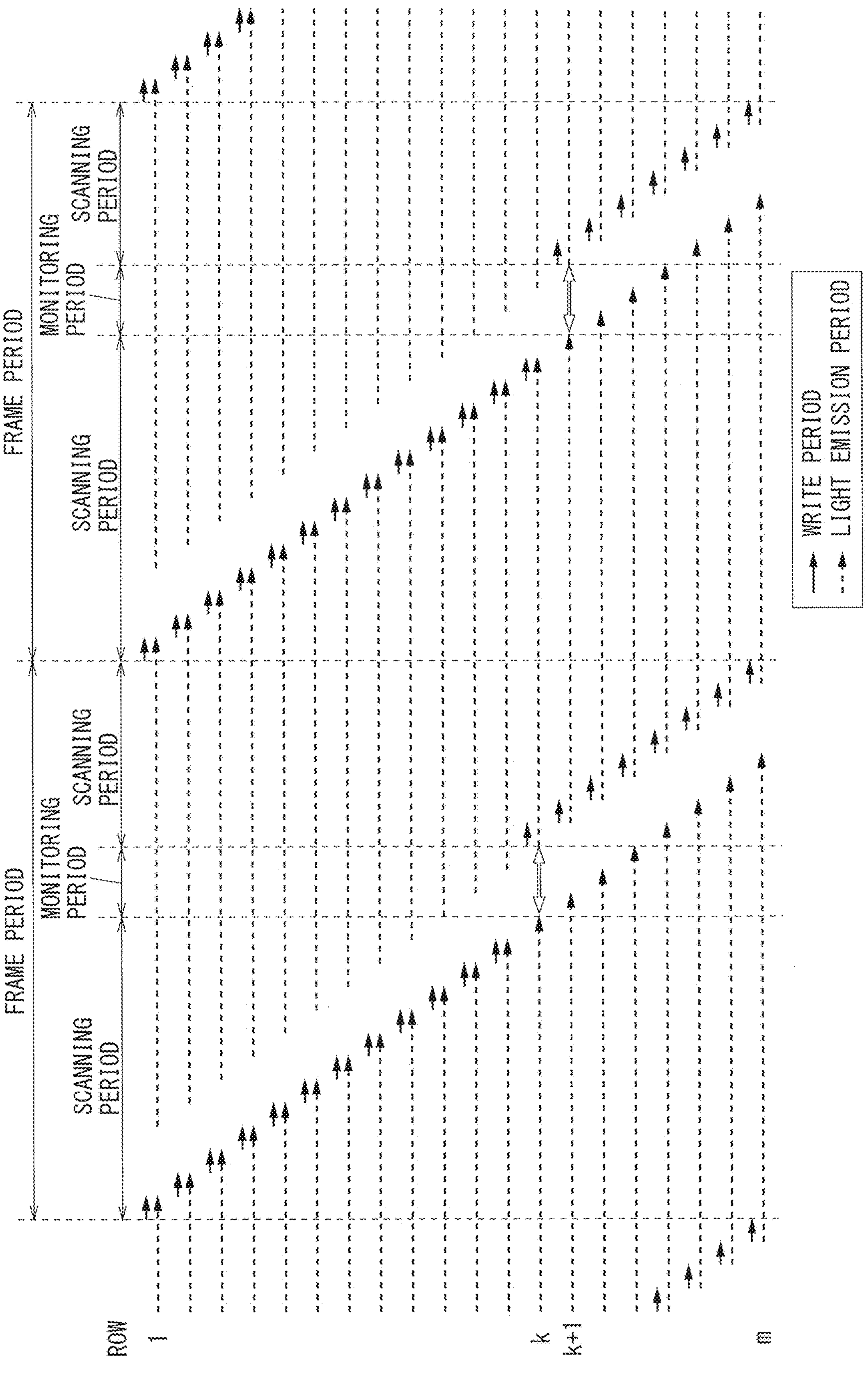
FIG. 6 is a diagram showing operation of the display device shown in FIG. 1 in the monitoring mode.

FIG. 6 is a diagram showing operation of the display device 10 in the monitoring mode. FIG. 6 describes operation performed during a frame period during which a kth row is a monitoring row, and operation performed during a frame period during which a (k+1)th row is a monitoring row. In FIG. 6, a short solid arrow indicates a write period of pixel circuits 20 in each row, a broken line arrow indicates a light emission period of pixel circuits 20 in each row, a blank period sandwiched between two light emission periods indicates a non-light-emission period of pixel circuits 20 in each row, and an open arrow indicates a monitoring period. Periods other than the monitoring period are scanning periods. The write period is a period during which the TFT 22 is turned on, the light emission period is a period during which the TFT 24 is turned on, and the non-light-emission period is a period during which the TFT 24 is turned off.

The frame period during which the kth row is a monitoring row will be described. A write period of pixel circuits 20 in the first row is set around the beginning of the frame period. A non-light-emission period of the pixel circuits 20 in the first row is set after the write period of the pixel circuits 20 in the first row. More specifically, the non-light-emission period of the pixel circuits 20 in the first row begins at a time that is earlier than the end of the write period of the pixel circuits 20 in the first row by a time shorter than one horizontal period, and ends after a predetermined period of time. A non-light-emission period of pixel circuits 20 in the second row is delayed by one horizontal period from the non-light-emission period of the pixel circuits 20 in the first row. Likewise, non-light-emission periods of pixel circuits 20 in the third to mth rows are delayed by one horizontal period from non-light-emission periods of pixel circuits 20 in the second to (m−1)th rows, respectively. A monitoring period partially overlaps a non-light-emission period of pixel circuits 20 in the kth row. The most part of the monitoring period is included in the non-light-emission period of the pixel circuits in the kth row.

A write period of the pixel circuits 20 in the second row is delayed by one horizontal period from the write period of the pixel circuits 20 in the first row. Likewise, write periods of pixel circuits 20 in the third to (k−1)th rows are delayed by one horizontal period from write periods of pixel circuits 20 in the second to (k−2)th rows, respectively. A write period of the pixel circuits 20 in the kth row is set after the monitoring period. A write period of pixel circuits 20 in a (k+1)th row is delayed by one horizontal period from the write period of the pixel circuits 20 in the kth row. Likewise, write periods of pixel circuits 20 in the (k+2)th to mth rows are delayed by one horizontal period from write periods of pixel circuits 20 in the (k+1)th to (m−1)th rows, respectively. For the pixel circuits 20 in each row, periods other than the non-light-emission period are light emission periods.

Figure 7:
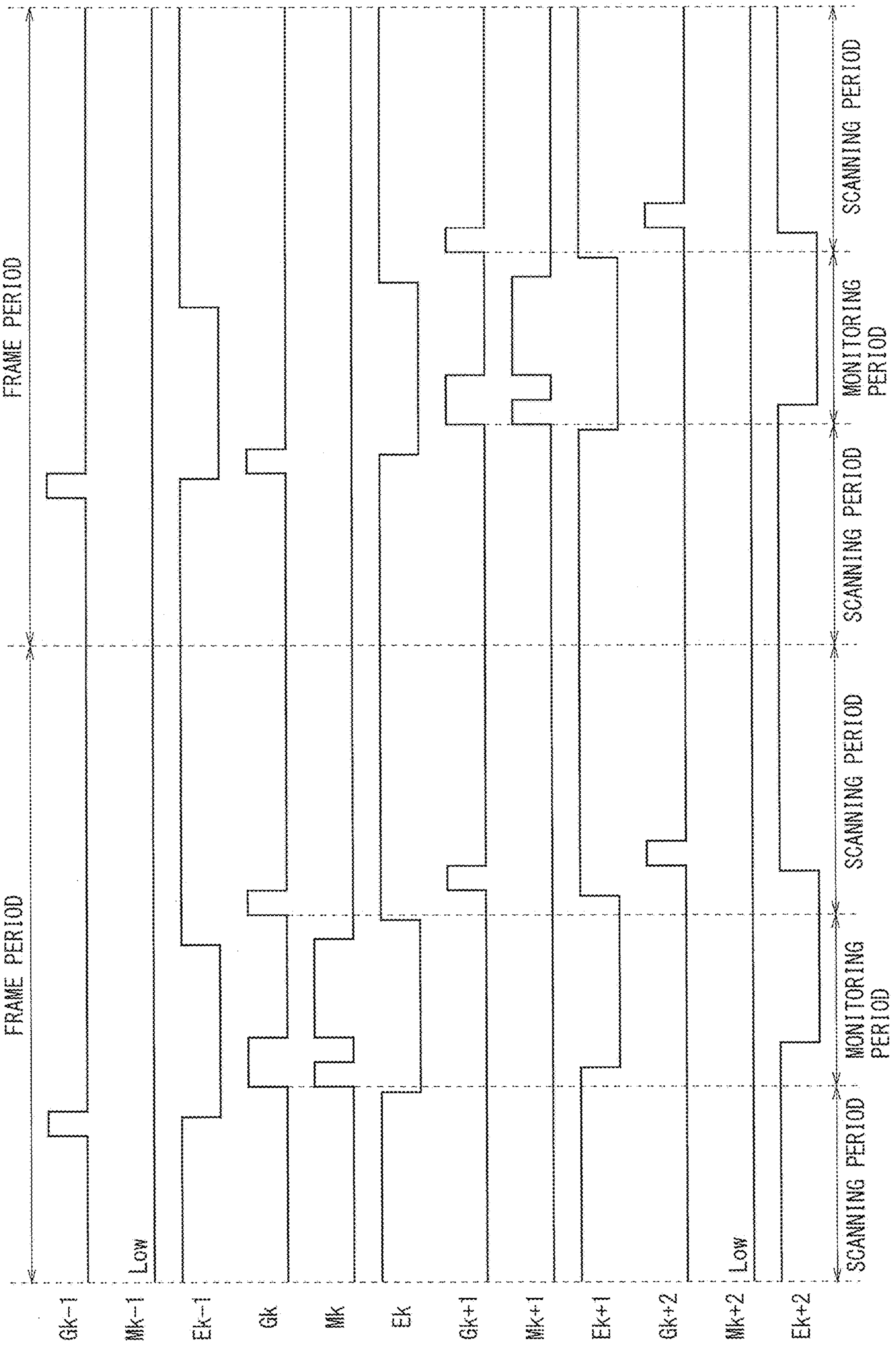
FIG. 7 is a timing chart for the display device shown in FIG. 1 in the monitoring mode.

FIG. 7 is a timing chart for the display device 10 in the monitoring mode. FIG. 7 describes changes in the potentials of signal lines during a period from a selection period of pixel circuits 20 in a (k−1)th row to a selection period of pixel circuits 20 in a (k+2)th row that is included in a frame period during which a kth row is a monitoring row and a frame period during which a (k+1)th row is a monitoring row.

The frame period during which the kth row is a monitoring row will be described. During this frame period, the (k−1)th row, the (k+1)th row, and the (k+2)th row are not monitoring rows. Hence, a low-level potential is fixedly applied to monitoring control lines Mk−1, Mk+1, and Mk+2. A high-level potential is applied to a scanning line Gk−1 during a (k−1)th horizontal period, and a low-level potential is applied to the scanning line Gk−1 during other periods. A low-level potential is applied to a light emission control line Ek−1 for a predetermined period of time from a point in time that is earlier than the end of the (k−1)th horizontal period by a time shorter than one horizontal period, and a high-level potential is applied to the light emission control line Ek−1 during other periods. The potentials of light emission control lines Ek to Ek+2 change likewise, delayed by one horizontal period compared to the potentials of the light emission control lines Ek−1 to Ek+1, respectively.

A high-level potential is applied to a scanning line Gk for two horizontal periods from the beginning of a monitoring period and for one horizontal period from the end of the monitoring period, and a low-level potential is applied to the scanning line Gk during other periods. A high-level potential is applied to a monitoring control line Mk for one horizontal period from the beginning of the monitoring period and for four horizontal periods from a point in time ahead by two horizontal periods from the beginning of the monitoring period, and a low-level potential is applied to the monitoring control line Mk during other periods. A high-level potential is applied to a scanning line Gk+1 for one horizontal period, delayed by one horizontal period from the period during which a high-level potential is applied to the scanning line Gk for the second time, and a low-level potential is applied to the scanning line Gk+1 during other periods. The potential of a scanning line Gk+2 changes likewise, delayed by one horizontal period compared to the scanning line Gk+1.

Figure 8:
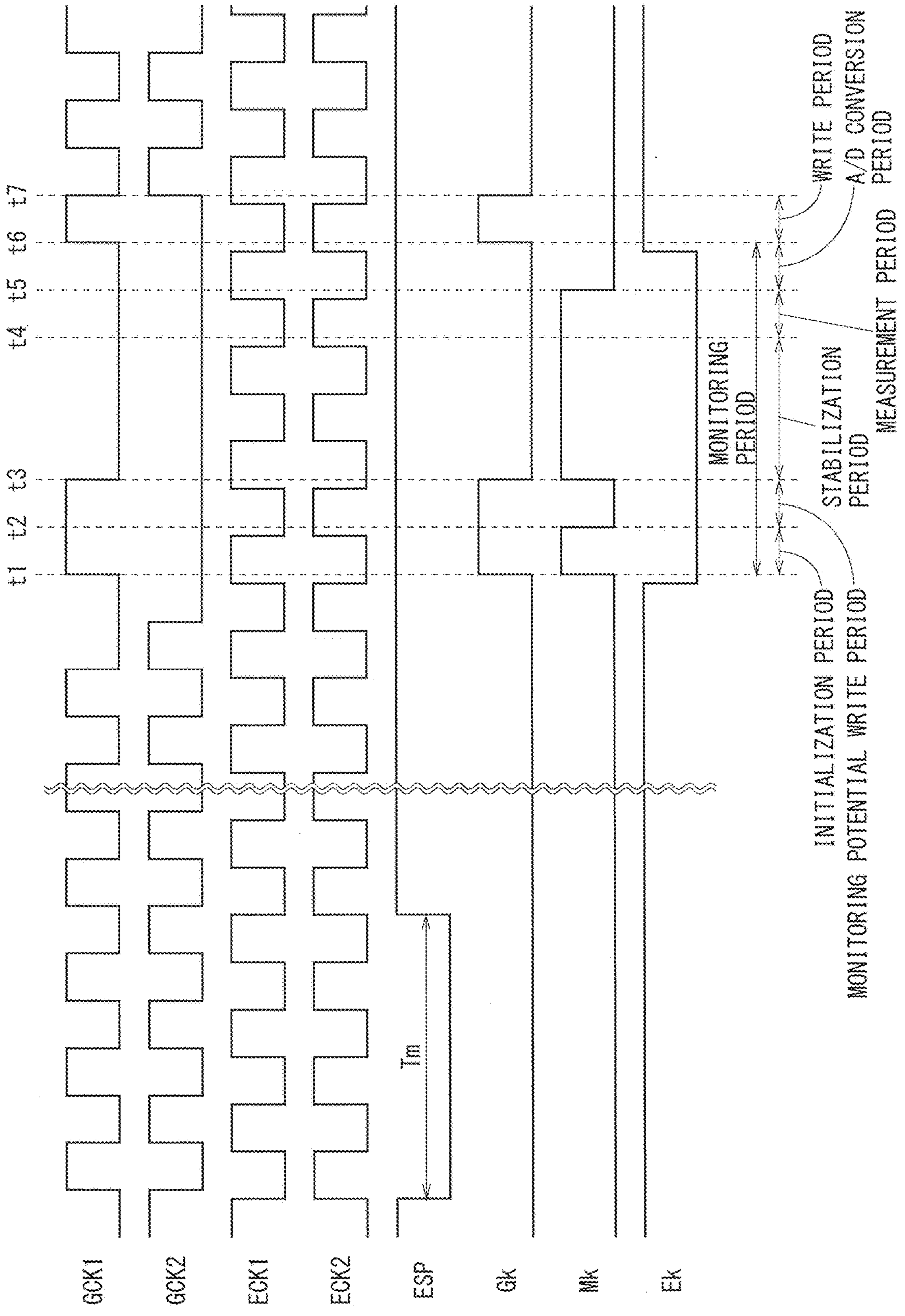
FIG. 8 is a timing chart showing a part of FIG. 7.
Figure 9A:
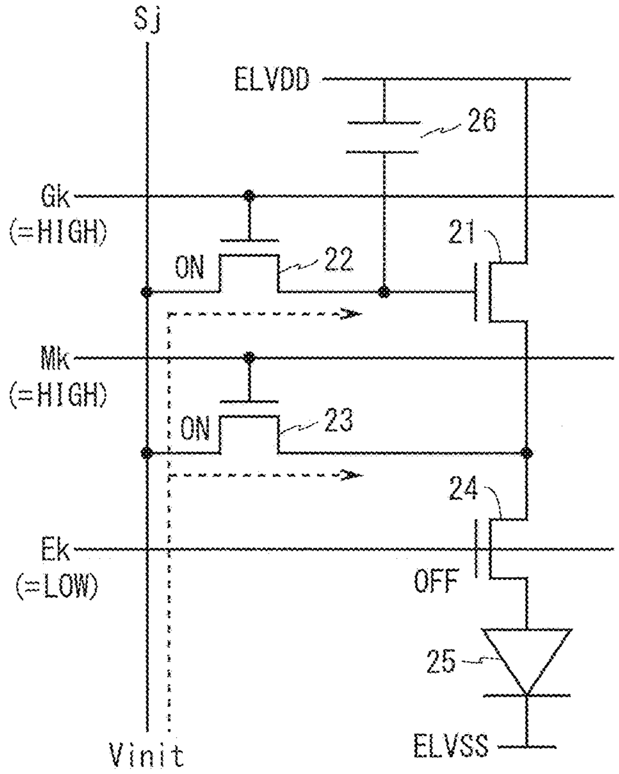
FIG. 9A is a diagram showing operation of the pixel circuit shown in FIG. 2 that is performed during a monitoring period.
Figure 9B:
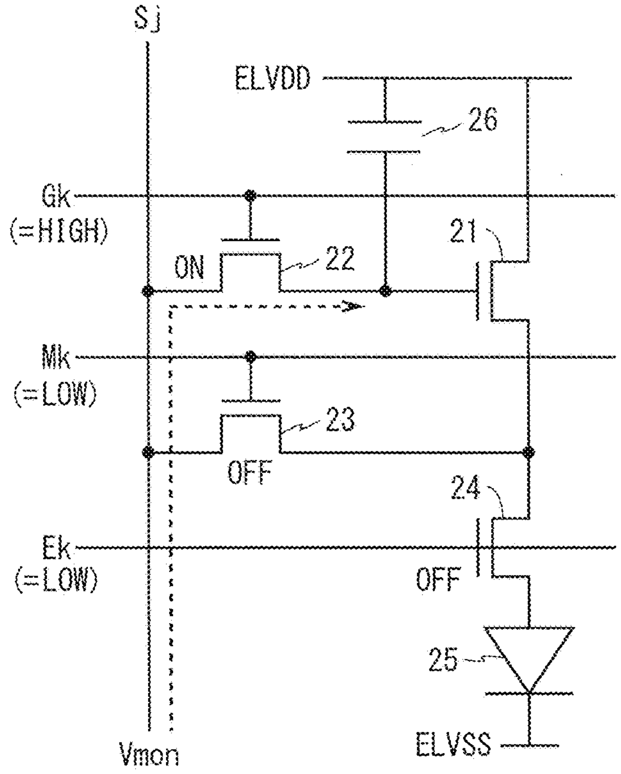
FIG. 9B is a diagram showing operation of the pixel circuit shown in FIG. 2 that is performed during the monitoring period.
Figure 9C:
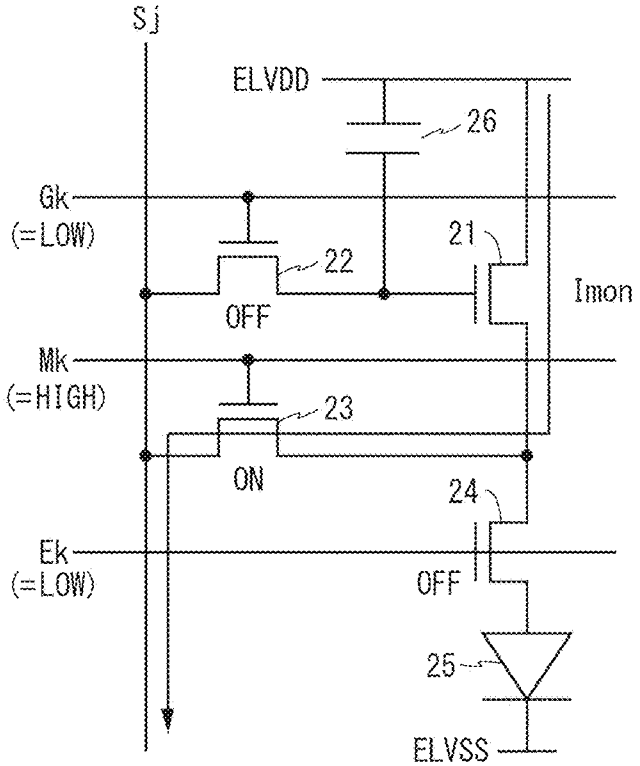
FIG. 9C is a diagram showing operation of the pixel circuit shown in FIG. 2 that is performed during the monitoring period.
Figure 9D:
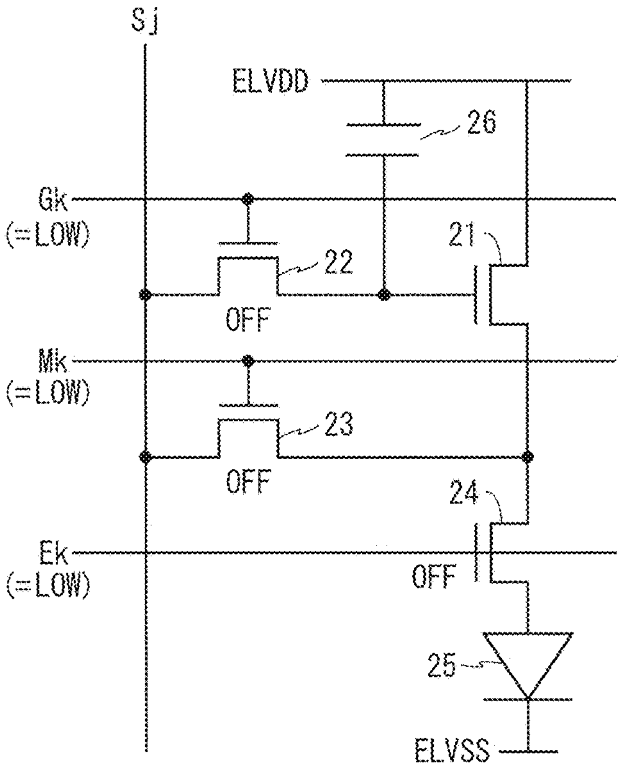
FIG. 9D is a diagram showing operation of the pixel circuit shown in FIG. 2 that is performed during the monitoring period.
Figure 9E:
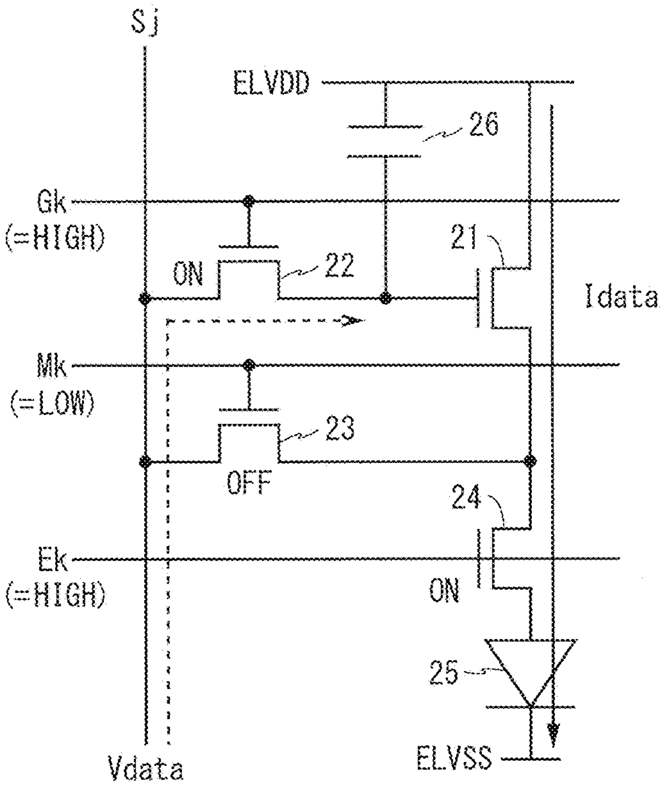
FIG. 9E is a diagram showing operation of the pixel circuit shown in FIG. 2 that is performed after the monitoring period.
Figure 9F:
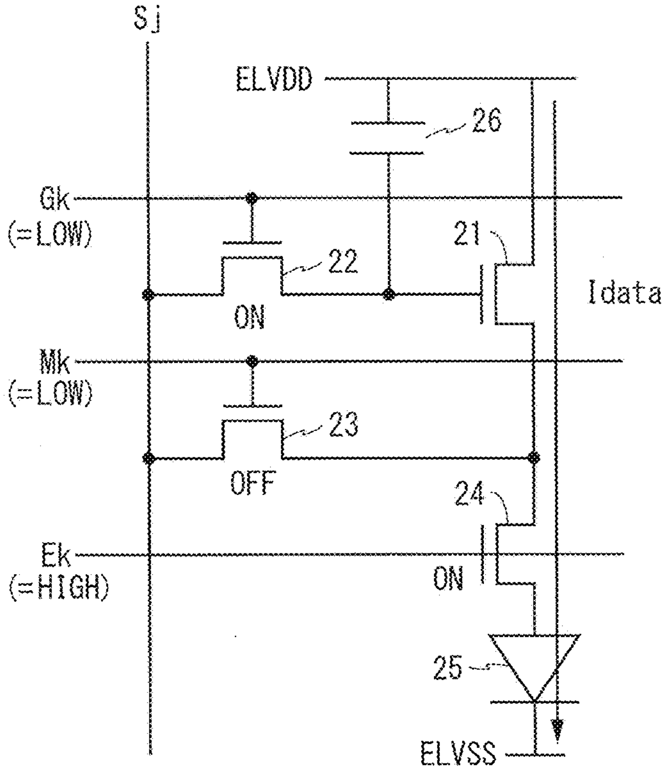
FIG. 9F is a diagram showing operation of the pixel circuit shown in FIG. 2 that is performed after the monitoring period.

FIG. 8 is a timing chart showing a part of FIG. 7. FIG. 8 describes changes in the potentials of signal lines during a monitoring period and periods before and after the monitoring period that are included in the frame period during which the kth row is a monitoring row. FIGS. 9A to 9D are diagrams showing operation of a pixel circuit 20 performed during the monitoring period. FIGS. 9E and 9F are diagrams showing operation of the pixel circuit 20 performed after the monitoring period. In FIGS. 9A to 9F, a broken line arrow indicates application of the potential of a data line Sj to a node in the pixel circuit 20, and a solid arrow indicates a current flowing inside the pixel circuit 20.

With reference to FIGS. 8 and 9A to 9F, operation of each pixel circuit 20 in the kth row (each pixel circuit 20 in the monitoring row) will be described. As shown in FIG. 8, the monitoring period includes an initialization period from time t1 to time t2, a monitoring potential write period from time t2 to time t3, a stabilization period from time t3 to time t4, a measurement period from time t4 to time t5, and an A/D conversion period from time t5 to time t6. A period from time t6 to time t7 is a write period of the pixel circuit 20 in the kth row that is set after the monitoring period.

Prior to time t1, the potentials of the scanning line Gk and the monitoring control line Mk are at a low level and the potential of the light emission control line Ek is at a high level. Hence, in the pixel circuit 20 in the kth row, the TFTs 22 and 23 are in off state and the TFT 24 is in on state.

The potential of the light emission control line Ek changes to a low level at a point in time that is earlier than time t1 by a time shorter than one horizontal period. Accordingly, the TFT 24 is turned off. At time t1, the potentials of the scanning line Gk and the monitoring control line Mk change to a high level. Accordingly, the TFTs 22 and 23 are turned on. During the initialization period, an initialization potential Vinit is applied to the data line Sj. Thus, the gate potential and source potential of the TFT 21 become equal to the initialization potential Vinit (FIG. 9A).

At time t2, the potential of the monitoring control line Mk changes to a low level. Accordingly, the TFT 23 is turned off. During the monitoring potential write period, a monitoring potential Vmon is applied to the data line Sj. Since the TFT 22 continues to be in on state, the gate potential of the TFT 21 becomes equal to the monitoring potential Vmon (FIG. 9B).

At time t3, the potential of the scanning line Gk changes to a low level and the potential of the monitoring control line Mk changes to a high level. Accordingly, the TFT 22 is turned off and the TFT 23 is turned on. During the stabilization period, a monitoring current Imon flows from the conductive member having the high-level power supply potential ELVDD to the data line Sj via the TFTs 21 and 23 (FIG. 9C). The stabilization period is provided to make the monitoring current Imon constant.

At time t4, the monitoring current Imon is substantially constant. During the measurement period, the current measurement circuit included in the data line drive and current measurement circuit 14 measures the monitoring current Imon flowing through the data line Sj.

At time t5, the potential of the monitoring control line Mk changes to a low level. Accordingly, the TFT 23 is turned off and the monitoring current Imon stops flowing (FIG. 9D). During the A/D conversion period, an A/D conversion circuit (not shown) included in the data line drive and current measurement circuit 14 converts the measured monitoring current Imon into a digital value. During a subsequent scanning period, the data line drive and current measurement circuit 14 outputs the obtained digital value to the correction circuit 15, as a measurement result X1 of the monitoring current Imon. The measurement result X1 is a result of measurement of a characteristic of the TFT 21.

The potential of the light emission control line Ek changes to a high level at a point in time that is earlier than time t6 by a time shorter than one horizontal period. Accordingly, the TFT 24 is turned on. At time t6, the potential of the scanning line Gk changes to a high level. Accordingly, the TFT 22 is turned on. During the write period, a data potential Vdata determined based on a corrected video signal D2 is applied to the data line Sj (FIG. 9E). Therefore, the gate potential of the TFT 21 becomes equal to the data potential Vdata.

After writing the data potential Vdata, a current Idata that passes through the TFTs 21 and 24 and the organic EL element 25 flows from the conductive member having the high-level power supply potential ELVDD to the conductive member having the low-level power supply potential ELVSS. The amount of the current Idata changes depending on the data potential Vdata. Thus, the organic EL element 25 emits light at luminance determined based on the data potential Vdata (FIG. 9F).

At time t7, the potential of the scanning line Gk changes to a low level. Accordingly, the TFT 22 is turned off. After time t7, the organic EL element 25 continues to emit light at luminance determined based on the data potential Vdata.

As such, non-light-emission periods delayed from each other by one horizontal period and having the same length are set for the rows of the pixel circuits 20 (FIG. 6). A monitoring period is set so as to partially overlap a non-light-emission period of a monitoring row (FIGS. 7 and 8). During the monitoring period, a characteristic of the TFT 21 in each pixel circuit 20 in the monitoring row is measured (FIGS. 9A to 9D). Writing of a data potential into each pixel circuit 20 in a row selected earlier than the monitoring row starts before a corresponding non-light-emission period. Writing in this case starts at a point in time that is earlier than the beginning of the corresponding non-light-emission period by a time shorter than one horizontal period. Write periods of data potentials into pixel circuits 20 in the monitoring row and a row selected later than the monitoring row are provided after corresponding non-light-emission periods. Writing in this case starts at a point in time ahead by a time shorter than one horizontal period from the end of a corresponding non-light-emission period (FIG. 7). Setting of various types of periods and driving of the scanning lines G1 to Gm, the monitoring control lines M1 to Mm, the light emission control lines E1 to Em, and the data lines S1 to Sn are performed by the scanning line and control line drive circuit 13 and the data line drive and current measurement circuit 14.

The scanning line and control line drive circuit 13 includes a scanning line drive circuit that drives the scanning lines G1 to Gm, a monitoring control line drive circuit that drives the monitoring control lines M1 to Mm, and a light emission control line drive circuit that drives the light emission control lines E1 to Em. These circuits may have any configuration as long as the scanning lines G1 to Gm, the monitoring control lines M1 to Mm, and the light emission control lines E1 to Em are driven at timing shown in FIGS. 4 and 7.

Figure 10:
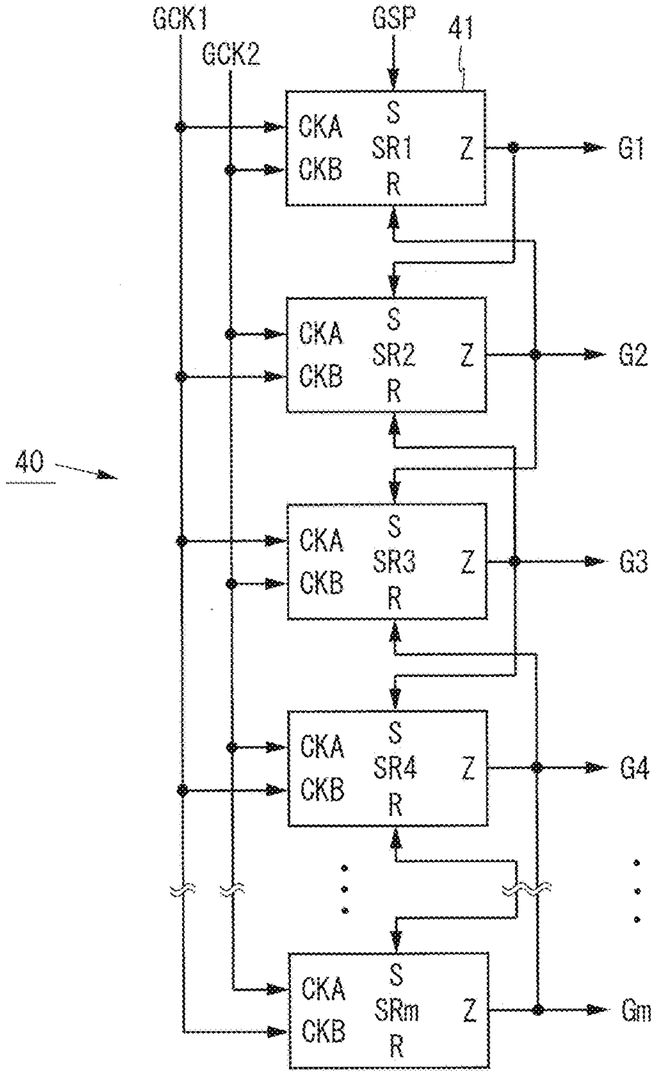
FIG. 10 is a block diagram showing a configuration of a scanning line drive circuit of the display device shown in FIG. 1.
Figure 11:
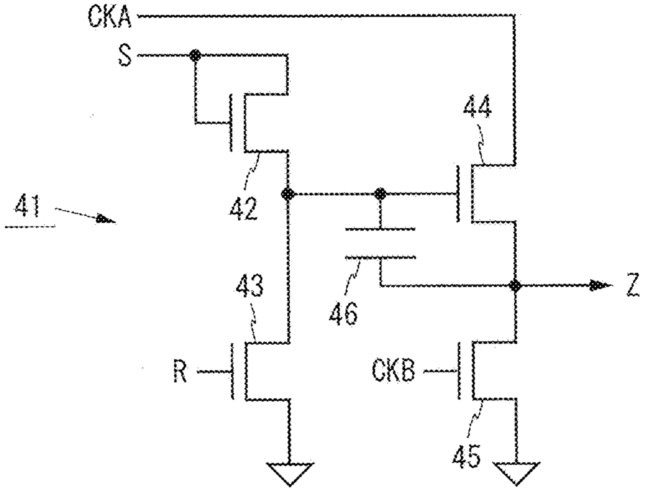
FIG. 11 is a circuit diagram of a unit circuit of the scanning line drive circuit shown in FIG. 10.

For example, the scanning line drive circuit may have a configuration shown in FIGS. 10 and 11. FIG. 10 is a block diagram showing a configuration of the scanning line drive circuit. A scanning line drive circuit 40 shown in FIG. 10 has a configuration in which m unit circuits 41 are connected to each other in multiple stages. The unit circuit 41 has clock terminals CKA and CKB, a set terminal S, a reset terminal R, and an output terminal Z. Two-phase gate clocks GCK1 and GCK2 and a gate start pulse GSP are supplied to the scanning line drive circuit 40.

The gate clock GCK1 is inputted to the clock terminals CKA of unit circuits 41 of odd-numbered stages and the clock terminals CKB of unit circuits 41 of even-numbered stages. The gate clock GCK2 is inputted to the clock terminals CKA of the unit circuits 41 of the even-numbered stages and the clock terminals CKB of the unit circuits 41 of the odd-numbered stages. The gate start pulse GSP is inputted to the set terminal S of a unit circuit 41 of the first stage. The output terminal Z of a unit circuit 41 of an ith stage is connected to a scanning line Gi, the reset terminal R of a unit circuit 41 of an (i−1)th stage, and the set terminal S of a unit circuit 41 of an (i+1)th stage.

FIG. 11 is a circuit diagram of a unit circuit 41. The unit circuit 41 shown in FIG. 11 includes TFTs 42 to 45 and a capacitor 46. The TFTs 42 to 45 are N-channel-type transistors. The drain terminal and gate terminal of the TFT 42 are connected to the set terminal S. A source terminal of the TFT 42 and a drain terminal of the TFT 43 are connected to a gate terminal of the TFT 44. A drain terminal of the TFT 44 is connected to the clock terminal CKA. A source terminal of the TFT 44 and a drain terminal of the TFT 45 are connected to the output terminal Z. A gate terminal of the TFT 43 is connected to the reset terminal R, and a gate terminal of the TFT 45 is connected to the clock terminal CKB. Source terminals of the TFTs 43 and 45 are grounded. The capacitor 46 is provided between the gate terminal and source terminal of the TFT 44.

When two-phase gate clocks GCK1 and GCK2 that alternately go to a high level for one horizontal period and a gate start pulse GSP that goes to a high level for only one horizontal period are provided to the scanning line drive circuit shown in FIGS. 10 and 11, the potentials of the scanning lines G1 to Gm go to a high level in turn for one horizontal period (FIG. 4).

When a kth row is a monitoring row and k is an odd number, the gate clock GCK2 is at a low level during a monitoring period, and the gate clock GCK1 is at a high level during an initialization period and a monitoring potential write period which are included in the monitoring period, and is at a low level during a stabilization period, a measurement period, and an A/D conversion period which are included in the monitoring period (FIG. 8). When a kth row is a monitoring row and k is an even number, the gate clock GCK1 is at a low level during a monitoring period, and the gate clock GCK2 is at a high level during an initialization period and a monitoring potential write period which are included in the monitoring period, and is at a low level during a stabilization period, a measurement period, and an A/D conversion period which are included in the monitoring period (not shown). In either case, the potential of the scanning line Gk is at a high level during the initialization period and the monitoring potential write period which are included in the monitoring period, and is at a low level during the stabilization period, the measurement period, and the A/D conversion period which are included in the monitoring period. Thus, according to the scanning line drive circuit shown in FIGS. 10 and 11, the scanning lines G1 to Gm can be driven at timing shown in FIGS. 4 and 7.

The light emission control line drive circuit may have a similar configuration to the scanning line drive circuit shown in FIGS. 10 and 11. Two-phase emission clocks ECK1 and ECK2 and an emission start pulse ESP are supplied to the light emission control line drive circuit. The emission start pulse ESP is at a low level for a plurality of horizontal periods Tm (FIG. 8). When two-phase emission clocks ECK1 and ECK2 that alternately go to a high level for one horizontal period and an emission start pulse ESP that goes to a low level for a plurality of horizontal periods Tm are provided to the light emission control line drive circuit, the potentials of the light emission control lines E1 to Em go to a low level, delayed by one horizontal period, for a plurality of horizontal periods Tm (FIG. 7). Thus, according to such a light emission control line drive circuit, the light emission control lines E1 to Em can be driven at timing shown in FIGS. 4 and 7.

As shown above, the display device 10 according to the present embodiment includes the plurality of scanning lines G1 to Gm, the plurality of light emission control lines E1 to Em, the plurality of data lines S1 to Sm, the plurality of pixel circuits 20 arranged in the row direction and the column direction, and a drive circuit (the scanning line and control line drive circuit 13 and the data line drive and current measurement circuit 14) that drives the scanning lines G1 to Gm, the light emission control lines E1 to Em, and the data lines S1 to Sn. The pixel circuit 20 includes a light-emitting element (organic EL element 25) and a drive transistor (TFT 21) that controls the amount of current flowing through the light-emitting element. The drive circuit has a monitoring mode, and during a frame period in the monitoring mode, the drive circuit sets non-light-emission periods, which are sequentially delayed by one horizontal period and have the same length, for rows of the pixel circuits 20, selects a row to be measured from among the rows of the pixel circuits 20 as a monitoring row, sets a monitoring period that partially overlaps a non-light-emission period of the monitoring row, and measures characteristics of drive transistors in pixel circuits 20 in the monitoring row during the monitoring period.

According to the display device 10 according to the present embodiment, by measuring characteristics of elements (TFT 21) in the pixel circuits 20 while controlling light-emitting elements included in pixel circuits 20 in a predetermined range of rows including a monitoring row to a non-light-emission state, a display screen can be prevented from being affected. In addition, the above-described non-light-emission periods can be set for the rows of the pixel circuits 20, using a simple circuit. Thus, characteristics of elements in the pixel circuits 20 can be easily measured while a screen is displayed.

During a frame period in the monitoring mode, the drive circuit starts writing of data potentials into pixel circuits 20 in a row selected earlier than a monitoring row, before a corresponding non-light-emission period (from a point in time that is earlier than the beginning of the corresponding non-light-emission period by a time shorter than one horizontal period), and starts writing of data potentials into pixel circuits 20 in the monitoring row and a row selected later than the monitoring row, after corresponding non-light-emission periods (from a point in time ahead by a time shorter than one horizontal period from the end of the corresponding non-light-emission periods). Such writing of data potentials can be easily performed using a scanning line drive circuit having a simple configuration.

During a monitoring period, the drive circuit writes a monitoring potential into pixel circuits 20 in a monitoring row. Thus, using the written monitoring potential, characteristics of drive transistors in the pixel circuits 20 can be measured. The pixel circuit 20 further includes a write control transistor (TFT 22) that has a control terminal (gate terminal) connected to a scanning line Gi and that controls writing of a data potential. During a write period of a data potential, the drive circuit applies an on potential to a corresponding scanning line Gi and applies a data potential to a data line Sj, and during a write period of a monitoring potential, the drive circuit applies an on potential to the corresponding scanning line and applies a monitoring potential to the data line. By this, a data potential or a monitoring potential can be written into a pixel circuit 20.

During a frame period in the monitoring mode, the drive circuit applies on potentials in turn to scanning lines, delayed by one horizontal period, corresponding to pixel circuits 20 in rows other than a monitoring row and applies an on potential to a scanning line corresponding to pixel circuits 20 in the monitoring row, delayed by a first time longer than one horizontal period from when an on potential is applied to a scanning line corresponding to pixel circuits in a previous row. The first time is equal to the length of two horizontal periods. By thus allowing timing at which an on potential is applied to a scanning line to be delayed during a monitoring period, a monitoring process can be securely performed.

The pixel circuit 20 further includes a light emission control transistor (TFT 24) that has a control terminal (gate terminal) connected to a light emission control line Ei and that controls light emission of the light-emitting element. During a frame period in the monitoring mode, the drive circuit applies an off potential to a light emission control line corresponding to pixel circuits 20 in a monitoring row, and then writes a monitoring potential into the pixel circuits 20 in the monitoring row, and applies an on potential to the light emission control line Ek corresponding to the pixel circuits 20 in the monitoring row, and then writes data potentials into the pixel circuits 20 in the monitoring row. By this, unwanted light emission during a monitoring period is prevented, enabling a light-emitting element to emit light at luminance determined based on a data potential.

During a frame period in the monitoring mode, the drive circuit applies an off potential to a corresponding light emission control line Ei during a non-light-emission period of each row of the pixel circuits 20. By this, during the non-light-emission period, the light-emitting element can be controlled to a non-light-emission state. During the frame period in the monitoring mode, to a light emission control line Ek corresponding to pixel circuits 20 in a monitoring row, the drive circuit applies an off potential before the beginning of a monitoring period (from a point in time earlier than the beginning of the monitoring period by a time shorter than one horizontal period), and applies an on potential before the end of the monitoring period (from a point in time earlier than the end of the monitoring period by a time shorter than one horizontal period). By this, during the monitoring period, light-emitting elements included in the pixel circuits 20 in the monitoring row can be controlled to a non-light-emission state.

During a frame period in the monitoring mode, the drive circuit applies an on potential to a corresponding light emission control line during a period other than a non-light-emission period of each row of the pixel circuits 20. By this, light-emitting elements included in pixel circuits 20 in rows other than a monitoring row are controlled to a light emission state, enabling measurement of characteristics of drive transistors in pixel circuits 20 in the monitoring row, while a screen is displayed.

The display device 10 further includes the plurality of monitoring control lines M1 to Mm, and the pixel circuit 20 further includes a monitoring control transistor (TFT 23) having a control terminal (gate terminal) connected to a monitoring control line Mi. The drive circuit applies an on potential and an off potential in a switching manner to a monitoring control line Mk corresponding to pixel circuits 20 in a monitoring row during a monitoring period, and applies an off potential to the monitoring control line Mi during other periods. By thus controlling the potential of the monitoring control line Mk corresponding to the pixel circuits 20 in the monitoring row, characteristics of drive transistors in the pixel circuits 20 in the monitoring row can be measured. The drive circuit selects a monitoring row in turn from among the rows of the pixel circuits 20. By this, monitoring rows are switched in turn, enabling measurement of characteristics of drive transistors in turn that are included in pixel circuits 20 in each row.

Second Embodiment

A display device according to a second embodiment has the same configuration as the display device according to the first embodiment (see FIGS. 1 and 2). The display device according to the present embodiment differs from that of the first embodiment in the driving manner of the light emission control lines E1 to Em in the monitoring mode. Differences from the first embodiment will be described below.

Figure 12:
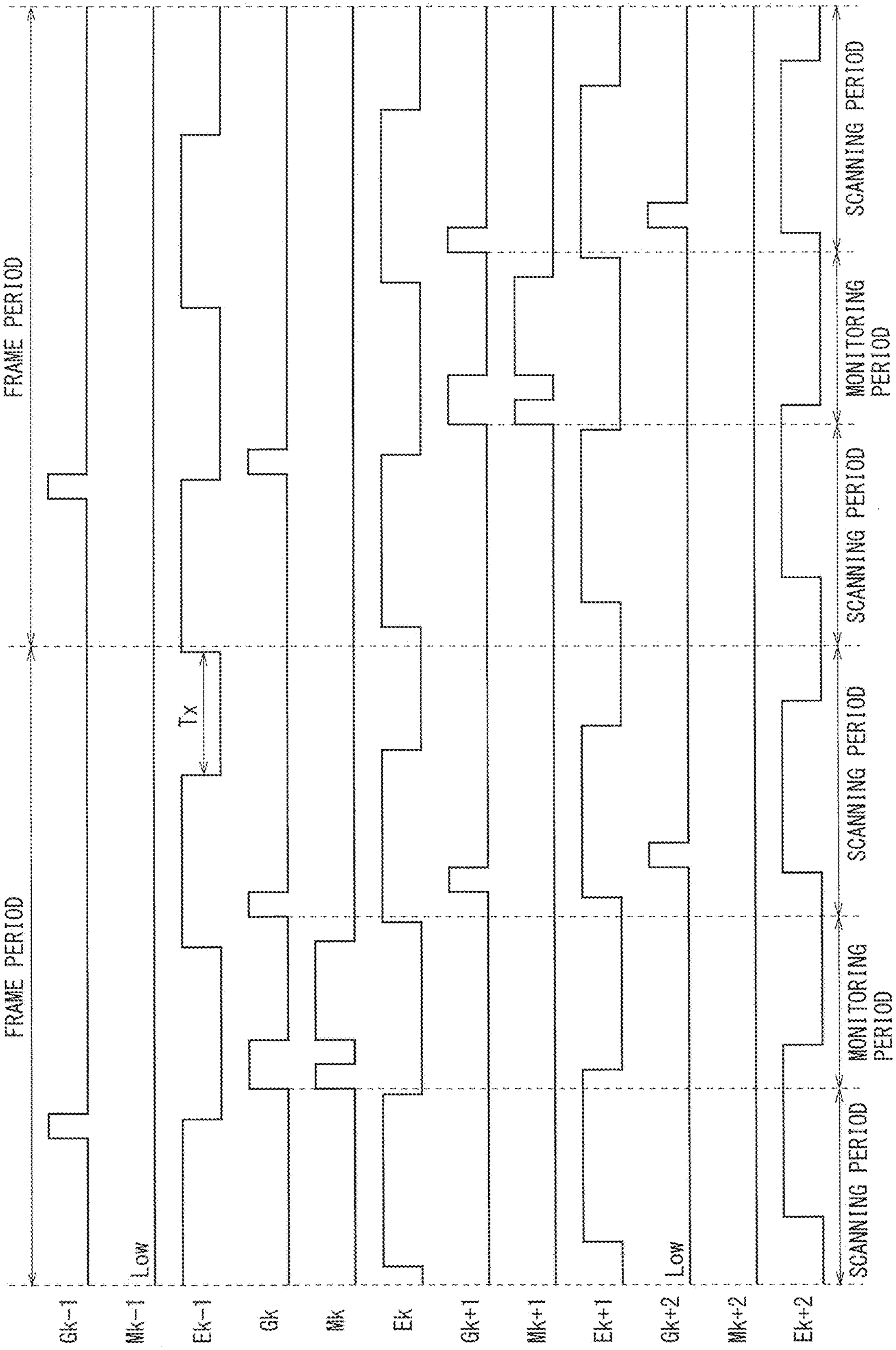
FIG. 12 is a timing chart for a display device according to a second embodiment in the monitoring mode.

FIG. 12 is a timing chart for the display device according to the present embodiment in the monitoring mode. FIG. 12 describes changes in the potentials of signal lines during the same period as that of FIG. 7. The potentials of the scanning lines Gk−1 to Gk+2 and the monitoring control lines Mk−1 to Mk+1 change in the same manner as in FIG. 7. The potentials of the light emission control lines Ek−1 to Ek+2 change in a different manner than in FIG. 7.

A low-level potential is applied to the light emission control line Ek−1 for a predetermined period of time from a point in time that is earlier than the end of the (k−1)th horizontal period by a time shorter than one horizontal period (during a non-light-emission period). In addition, in the present embodiment, a second non-light-emission period Tx is set, and during the second non-light-emission period Tx, too, a low-level potential is applied to the light emission control line Ek−1. The potentials of the light emission control lines Ek to Ek+2 change likewise, delayed by one horizontal period compared to the potentials of the light emission control lines Ek−1 to Ek+1, respectively.

As such, second non-light-emission periods Tx that are sequentially delayed by one horizontal period and have the same length are set for the rows of the pixel circuits 20. A low-level potential is applied to the light emission control lines E1 to Em during a non-light-emission period and a second non-light-emission period Tx.

In the display device according to the present embodiment, during a frame period in the monitoring mode, the drive circuit (the scanning line and control line drive circuit 13 and the data line drive and current measurement circuit 14) sets second non-light-emission periods Tx, which are sequentially delayed by one horizontal period and have the same length, for the rows of the pixel circuits 20, and the drive circuit applies an off potential (low-level potential) to a corresponding light emission control line in a non-light-emission period and a second non-light-emission period Tx for each row of the pixel circuits 20 and applies an on potential (high-level potential) to the corresponding light emission control line in other periods. According to the display device according to the present embodiment, by setting the second non-light-emission periods Tx for the rows of the pixel circuits 20, the luminance of a display screen can be easily adjusted.

Third Embodiment

A display device according to a third embodiment has the same configuration as the display devices according to the first and second embodiments (see FIGS. 1 and 2). The display device according to the present embodiment differs from those of the first and second embodiments in the driving manner of the light emission control lines E1 to Em in the monitoring mode. Differences from the first and second embodiments will be described below.

Figure 13:
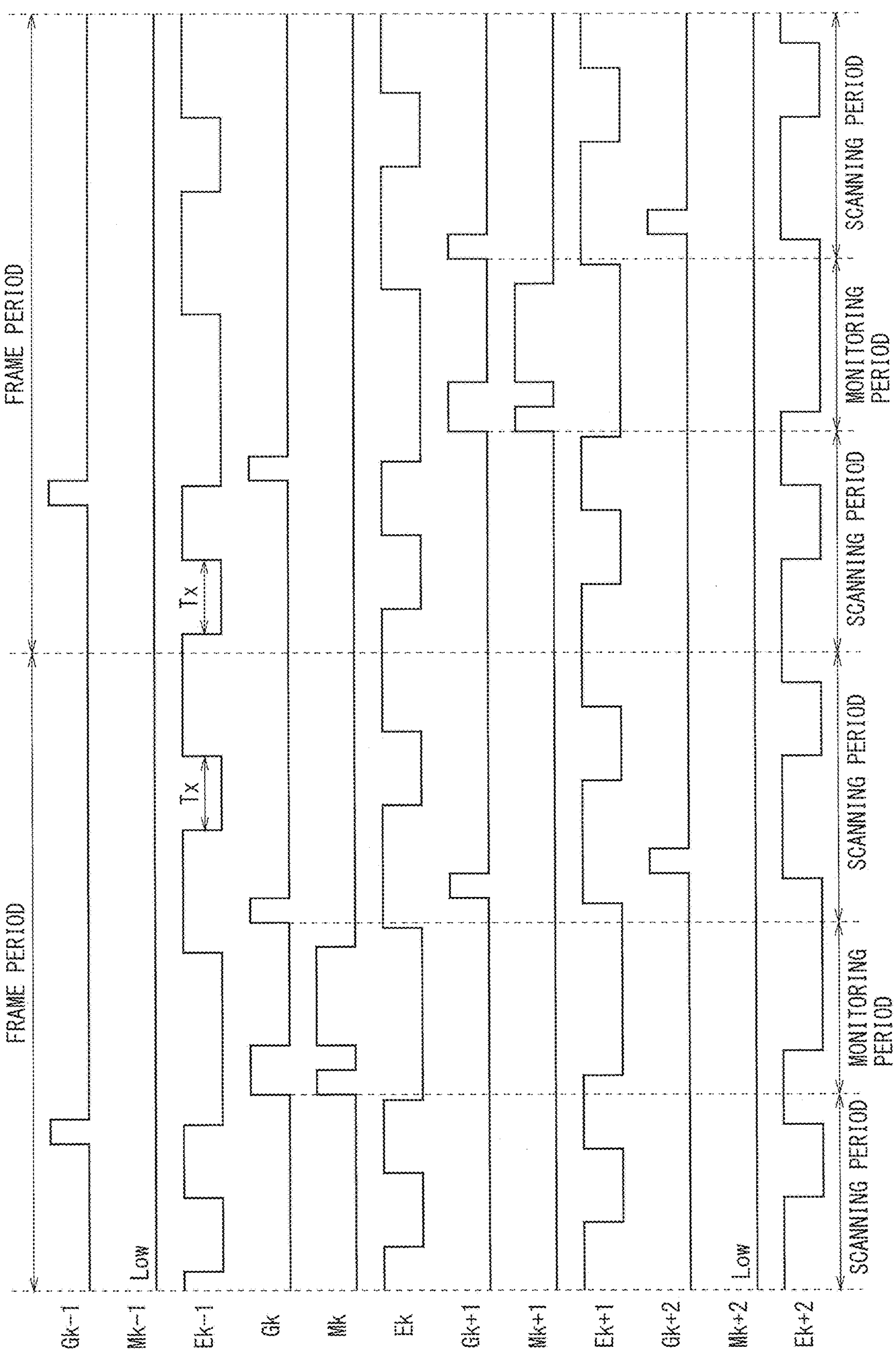
FIG. 13 is a timing chart for a display device according to a third embodiment in the monitoring mode.

FIG. 13 is a timing chart for the display device according to the present embodiment in the monitoring mode. FIG. 13 describes changes in the potentials of signal lines during the same period as that of FIG. 7. The potentials of the scanning lines Gk−1 to Gk+2 and the monitoring control lines Mk−1 to Mk+1 change in the same manner as in FIGS. 7 and 12. The potentials of the light emission control lines Ek−1 to Ek+2 change in a different manner than in FIGS. 7 and 12.

A low-level potential is applied to the light emission control line Ek−1 for a predetermined period of time from a point in time that is earlier than the end of the (k−1)th horizontal period by a time shorter than one horizontal period (during a non-light-emission period). In addition, in the present embodiment, a plurality of (two in this case) second non-light-emission period Tx are set, and during each of the second non-light-emission periods Tx, too, a low-level potential is applied to the light emission control line Ek−1. The potentials of the light emission control lines Ek to Ek+2 change likewise, delayed by one horizontal period from the potentials of the light emission control lines Ek−1 to Ek+1, respectively.

In the display device according to the present embodiment, during a frame period in the monitoring mode, the drive circuit (the scanning line and control line drive circuit 13 and the data line drive and current measurement circuit 14) sets a plurality of second non-light-emission periods Tx for each row of the pixel circuits 20. According to the display device according to the present embodiment, by allowing a light-emitting element (organic EL element 25) to blink a plurality of times during a frame period, flicker can be less likely to be visually identified.

Figure 14:
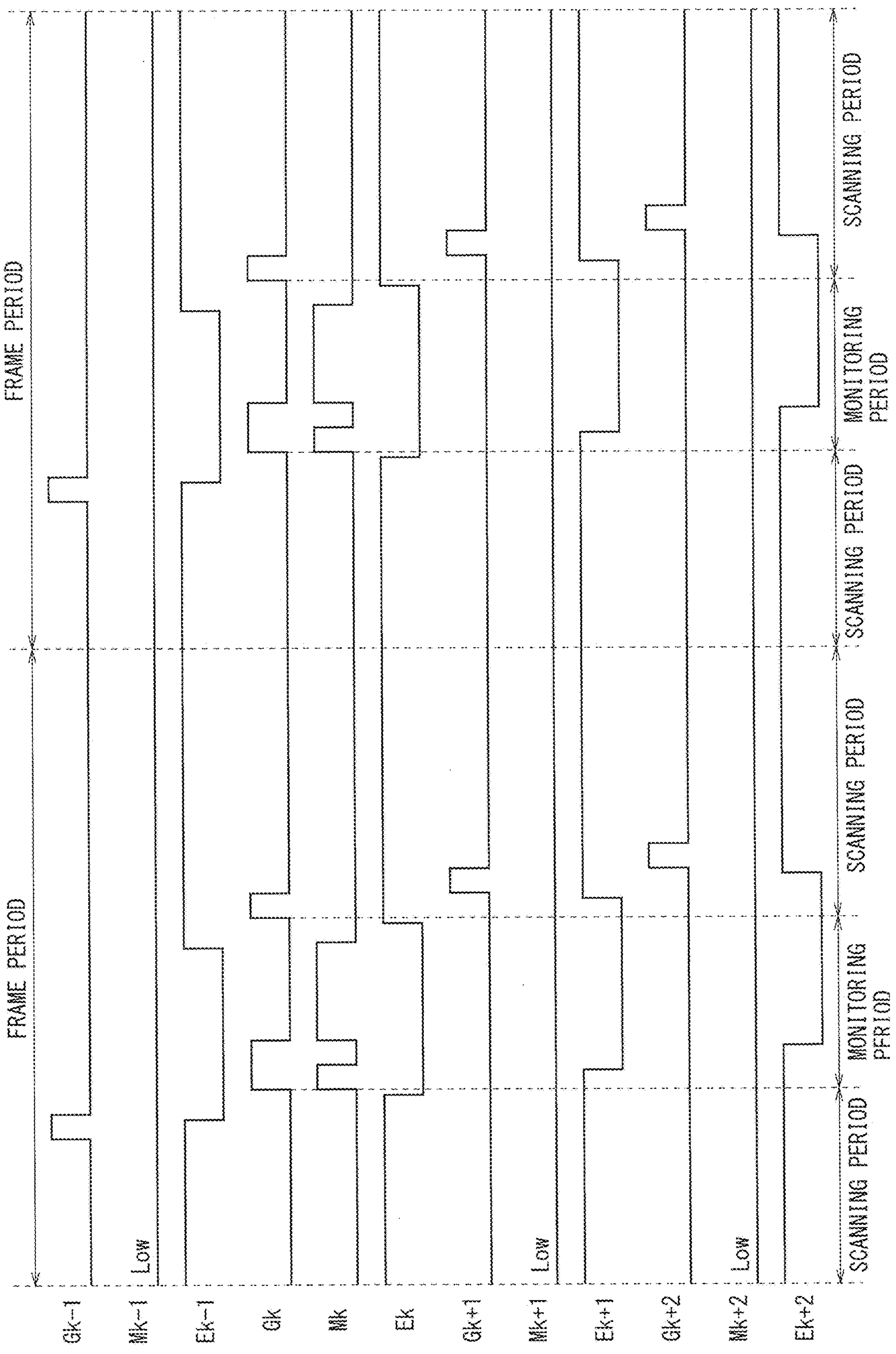
FIG. 14 is a timing chart for a display device according to a first variant in the monitoring mode.

Regarding the display devices according to the above-described embodiments, various variants can be formed. In the display devices according to the above-described embodiments, the drive circuit (the scanning line and control line drive circuit 13 and the data line drive and current measurement circuit 14) selects a monitoring row in turn from among the rows of the pixel circuits 20. The drive circuit may select a monitoring row by other methods. The drive circuit may continuously select, as a monitoring row, the same row a plurality of times from among the rows of the pixel circuits 20 (first variant). FIG. 14 is a timing chart for a display device according to the first variant in the monitoring mode. In two frame periods shown in FIG. 14, a kth row is a monitoring row. Alternatively, the drive circuit may randomly select a monitoring row from among the rows of the pixel circuits 20 (second variant).

In the display devices according to the above-described embodiments, the drive circuit measures characteristics of drive transistors (TFTs 21) included in pixel circuits 20 in a monitoring row during a monitoring period. The drive circuit may measure characteristics of light-emitting elements (organic EL elements 25) included in the pixel circuits 20 in the monitoring row during the monitoring period (third variant). As such, the drive circuit may measure characteristics of the light-emitting elements or drive transistors included in the pixel circuits 20 in the monitoring row during the monitoring period. In the display devices according to the above-described embodiments, the drive circuit has the normal mode and the monitoring mode. The drive circuit may have only the monitoring mode (fourth variant).

In the display devices according to the above-described embodiments, during an initialization period provided at the beginning of a monitoring period, the drive circuit initializes the potential of a node (the gate potential and source potential of a TFT 21) in a pixel circuit 20. The drive circuit may not initialize the potential of the node in the pixel circuit 20 during the monitoring period (fifth variant). Moreover, the drive circuit may provide an output period after an A/D conversion period included in the monitoring period and output a digital value obtained by A/D conversion to the correction circuit 15 during the output period (sixth variant). Further, the lengths of the initialization period, monitoring potential write period, stabilization period, measurement period, and A/D conversion period which are included in the monitoring period may be any length (seventh variant).

Although an organic EL display device including pixel circuits each including an organic EL element (organic light-emitting diode) has been described as an example of a display device including pixel circuits each including a light-emitting element, an inorganic EL display device including pixel circuits each including an inorganic light-emitting diode, a quantum-dot light-emitting diode (QLED) display device including pixel circuits each including a quantum-dot light-emitting diode, or an LED display device including pixel circuits each including a Mini LED or a Micro LED may be formed by the same method (eighth variant). In addition, a display device having features of the above-described embodiments and variants may be formed by arbitrarily combining features of the display devices described above, as long as there is no contradiction in the properties of the features.

DESCRIPTION OF REFERENCE CHARACTERS

10: DISPLAY DEVICE
11: DISPLAY UNIT
12: DISPLAY CONTROL CIRCUIT
13: SCANNING LINE AND CONTROL LINE DRIVE CIRCUIT
14: DATA LINE DRIVE AND CURRENT MEASUREMENT CIRCUIT
15: CORRECTION CIRCUIT
20: PIXEL CIRCUIT
21 to 24, 42 to 45: TFT
25: ORGANIC EL ELEMENT
26, 46: CAPACITOR
30: DISPLAY SCREEN
31: NON-LIGHT-EMITTING PORTION
32: LIGHT-EMITTING PORTION
40: SCANNING LINE DRIVE CIRCUIT
41: UNIT CIRCUIT

The invention claimed is:

1. A display device comprising:
a plurality of scanning lines;
a plurality of light emission control lines;
a plurality of data lines;
a plurality of pixel circuits arranged in a row direction and a column direction; and
a drive circuit configured to write data potentials into the plurality of pixel circuits by driving the plurality of scanning lines, the plurality of light emission control lines, and the plurality of data lines, wherein
each of the plurality of pixel circuits includes a light-emitting element and a drive transistor configured to control an amount of current flowing through the light-emitting element,
the drive circuit has a monitoring mode, and during a frame period in the monitoring mode, the drive circuit sets non-light-emission periods for rows of the plurality of pixel circuits, selects a row to be measured from among the rows of the plurality of pixel circuits as a monitoring row, sets a monitoring period that partially overlaps a non-light-emission period of the monitoring row, and measures characteristics of light-emitting elements or drive transistors in pixel circuits in the monitoring row during the monitoring period, the non-light-emission periods being sequentially delayed and having a same length, and
during the frame period in the monitoring mode, the drive circuit starts writing of the data potentials into pixel circuits in a row selected earlier than the monitoring row, before a corresponding non-light-emission period, and starts writing of the data potentials into pixel circuits in the monitoring row and a row selected later than the monitoring row, after corresponding non-light-emission periods.

2. The display device according to claim 1, wherein during the frame period in the monitoring mode, the drive circuit starts writing of the data potentials into pixel circuits in a row selected earlier than the monitoring row, at a point in time that is earlier than a beginning of a corresponding non-light-emission period by a time shorter than one horizontal period, and starts writing of the data potentials into pixel circuits in the monitoring row and a row selected later than the monitoring row, at a point in time ahead by a time shorter than one horizontal period from an end of corresponding non-light-emission periods.

3. The display device according to claim 1, wherein
during the monitoring period, the drive circuit writes a monitoring potential into the pixel circuits in the monitoring row,
each of the plurality of pixel circuits further includes a light emission control transistor having a control terminal connected to a corresponding light emission control line, and configured to control light emission of the light-emitting element, and
during the frame period in the monitoring mode, the drive circuit applies an off potential to a light emission control line corresponding to the pixel circuits in the monitoring row, and then writes the monitoring potential into the pixel circuits in the monitoring row, and applies an on potential to the light emission control line corresponding to the pixel circuits in the monitoring row, and then writes the data potentials into the pixel circuits in the monitoring row.

4. The display device according to claim 1,
each of the plurality of pixel circuits further includes a light emission control transistor having a control terminal connected to a corresponding light emission control line, and configured to control light emission of the light-emitting element, and during the frame period in the monitoring mode, the drive circuit applies an off potential to a corresponding light emission control line during a non-light-emission period of each row of the plurality of pixel circuits.

5. The display device according to claim 4, wherein during the frame period in the monitoring mode, to a light emission control line corresponding to the pixel circuits in the monitoring row, the drive circuit applies an off potential before a beginning of the monitoring period and applies an on potential before an end of the monitoring period.

6. The display device according to claim 5, wherein during the frame period in the monitoring mode, to a light emission control line corresponding to the pixel circuits in the monitoring row, the drive circuit applies an off potential from a point in time earlier than a beginning of the monitoring period by a time shorter than one horizontal period and applies an on potential from a point in time earlier than an end of the monitoring period by a time shorter than one horizontal period.

7. The display device according to claim 4, wherein during the frame period in the monitoring mode, the drive circuit applies an on potential to a corresponding light emission control line during a period other than a non-light-emission period of each row of the plurality of pixel circuits.

8. The display device according to claim 4, wherein during the frame period in the monitoring mode, the drive circuit sets second non-light-emission periods for the rows of the plurality of pixel circuits, and the drive circuit applies an off potential to a corresponding light emission control line in a non-light-emission period and a second non-light-emission period of each row of the plurality of pixel circuits and applies an on potential to the corresponding light emission control line in other periods, the second non-light-emission periods being sequentially delayed and having a same length.

9. The display device according to claim 8, wherein during the frame period in the monitoring mode, the drive circuit sets a plurality of the second non-light-emission periods for each row of the plurality of pixel circuits.

10. The display device according to claim 1, further comprising a plurality of monitoring control lines, wherein each of the plurality of pixel circuits further includes a monitoring control transistor having a control terminal connected to a corresponding monitoring control line, and during the monitoring period, the drive circuit applies an on potential and an off potential in a switching manner to a monitoring control line corresponding to the pixel circuits in the monitoring row, and applies an off potential to the monitoring control line during other periods.

11. The display device according to claim 1, wherein the drive circuit selects the monitoring row in turn from among the rows of the plurality of pixel circuits.

12. The display device according to claim 1, wherein the drive circuit continuously selects, as the monitoring row, a same row a plurality of times from among the rows of the plurality of pixel circuits.

13. The display device according to claim 1, wherein the drive circuit randomly selects the monitoring row from among the rows of the plurality of pixel circuits.

14. The display device according to claim 1, wherein the non-light-emission periods are sequentially delayed by one horizontal period.

15. A display device comprising:

a plurality of scanning lines;

a plurality of light emission control lines;

a plurality of data lines;

a plurality of pixel circuits arranged in a row direction and a column direction; and a drive circuit configured to write data potentials into the plurality of pixel circuits by driving the plurality of scanning lines, the plurality of light emission control lines, and the plurality of data lines, wherein each of the plurality of pixel circuits includes a light-emitting element and a drive transistor configured to control an amount of current flowing through the light-emitting element, the drive circuit has a monitoring mode, and during a frame period in the monitoring mode, the drive circuit sets non-light-emission periods for rows of the plurality of pixel circuits, selects a row to be measured from among the rows of the plurality of pixel circuits as a monitoring row, sets a monitoring period that partially overlaps a non-light-emission period of the monitoring row, and measures characteristics of light-emitting elements or drive transistors in pixel circuits in the monitoring row during the monitoring period, the non-light-emission periods being sequentially delayed and having a same length, during the monitoring period, the drive circuit writes a monitoring potential into the pixel circuits in the monitoring row, each of the plurality of pixel circuits further includes a write control transistor having a control terminal connected to a corresponding scanning line, and configured to control writing of the data potential, during a write period of the data potentials, the drive circuit applies an on potential to a corresponding scanning line and applies the data potentials to the plurality of data lines, and during a write period of the monitoring potential, the drive circuit applies an on potential to a corresponding scanning line and applies the monitoring potential to the plurality of data lines, and during the frame period in the monitoring mode, the drive circuit applies on potentials in turn to scanning lines, delayed by one horizontal period, corresponding to pixel circuits in rows other than the monitoring row and applies an on potential to a scanning line corresponding to the pixel circuits in the monitoring row, delayed by a first time from when an on potential is applied to a scanning line corresponding to pixel circuits in a previous row, the first time being longer than one horizontal period.

16. The display device according to claim 15, wherein the first time is equal to a length of two horizontal periods.

17. The display device according to claim 15, further comprising a plurality of monitoring control lines, wherein each of the plurality of pixel circuits further includes a monitoring control transistor having a control terminal connected to a corresponding monitoring control line, and during the monitoring period, the drive circuit applies an on potential and an off potential in a switching manner to a monitoring control line corresponding to the pixel circuits in the monitoring row, and applies an off potential to the monitoring control line during other periods.

18. The display device according to claim 15, wherein the drive circuit continuously selects, as the monitoring row, a same row a plurality of times from among the rows of the plurality of pixel circuits.

19. A display device comprising:

a plurality of scanning lines;

a plurality of light emission control lines;

a plurality of data lines;

a plurality of pixel circuits arranged in a row direction and a column direction; and a drive circuit configured to write data potentials into the plurality of pixel circuits by driving the plurality of scanning lines, the plurality of light emission control lines, and the plurality of data lines, wherein each of the plurality of pixel circuits includes a light-emitting element and a drive transistor configured to control an amount of current flowing through the light-emitting element, the drive circuit has a monitoring mode, and during a frame period in the monitoring mode, the drive circuit sets non-light-emission periods for rows of the plurality of pixel circuits, selects a row to be measured from among the rows of the plurality of pixel circuits as a monitoring row, sets a monitoring period that partially overlaps a non-light-emission period of the monitoring row, and measures characteristics of light-emitting elements or drive transistors in pixel circuits in the monitoring row during the monitoring period, the non-light-emission periods being sequentially delayed and having a same length, each of the plurality of pixel circuits further includes a light emission control transistor having a control terminal connected to a corresponding light emission control line, and configured to control light emission of the light-emitting element, during the frame period in the monitoring mode, the drive circuit applies an off potential to a corresponding light emission control line during a non-light-emission period of each row of the plurality of pixel circuits, and during the frame period in the monitoring mode, to a light emission control line corresponding to the pixel circuits in the monitoring row, the drive circuit applies an off potential before a beginning of the monitoring period and applies an on potential before an end of the monitoring period.

20. The display device according to claim 19, wherein during the frame period in the monitoring mode, to a light emission control line corresponding to the pixel circuits in the monitoring row, the drive circuit applies an off potential from a point in time earlier than a beginning of the monitoring period by a time shorter than one horizontal period and applies an on potential from a point in time earlier than an end of the monitoring period by a time shorter than one horizontal period.

* * * * *